VIDEO MAPPING DEVICE

Filed June 1, 1965 5 Sheets-Sheet 1

INVENTORS.
RICHARD D. WILMOT,
NOROL T. EVANS,
JAMES N. CLAY,
BY Robert H. Himes
ATTORNEY June 13, 1967 R. D. WILMOT ETAL 3,325,806

VIDEO MAPPING DEVICE

Filed June 1, 1965 5 Sheets-Sheet 2

June 13, 1967 R. D. WILMOT ETAL 3,325,806

VIDEO MAPPING DEVICE

Filed June 1, 1965 5 Sheets-Sheet 4

VIDEO MAPPING DEVICE

Filed June 1, 1965

5 Sheets-Sheet 5

3,325,806
VIDEO MAPPING DEVICE
Richard Dean Wilmot, Fullerton, Norol T. Evans, San Pedro, and James N. Clay, Fullerton, Calif., assignors to Hughes Aircraft Company, Culver City, Calif., a corporation of Delaware
Filed June 1, 1965, Ser. No. 460,267
4 Claims. (Cl. 343—5)

This invention relates to a digital video mapping device for use in radar data processing systems and, more particularly, to a dark target memory used as an apparatus for inhibiting non-target video reports from selected areas from being processed by an associated computer.

In contemporary radar systems wherein video is automatically processed, the "raw" video received in response to exploratory pulses from the radar is first quantized; i.e., the raw video is converted to a series of "1's" or information level signals and "0's" by a video quantizer depending on whether the video exceeds or does not exceed a threshold level, respectively. Video that exceeds the threshold level of the video quantizer is called a hit; video that does not exceed the threshold level is called a miss.

One of the principal problems in a system which automatically processes video from a surveillance radar is distinguishing between valid and invalid returns. An operator detects a valid target by noting its video return pattern, which is approximately one antenna beam width in azimuth and one pulse width in range, and by the fact that its position changes from scan to scan. An automatic data processing system attempts to identify valid targets in the same manner; i.e., a target detector samples range bins during an antenna scan and when a specified percentage of hits are found, a target indication is reported. Other video returns besides those from valid targets, however, will satisfy the minimum hit criteria. Noise generates a few invalid hits which can be eliminated by scan to scan position correlation. Adjacent radar interference, sometimes referred to as "running rabbit" or "Archimedean Spiral" video returns, is also random in most cases and will not correlate in range, so this presents no problem. Ground clutter and weather returns are more difficult to deal with.

Some contemporary systems accept all of the above-mentioned returns and then use a large computer and memory together with a complex computer program to distinguish between valid and invalid target returns. Systems of this type are very expensive and are subject to saturation. Tests have shown that a typical "clean" radar environment generates from 1000 to 1400 target reports per antenna scan (with 50 valid target reports on the average), and that when clouds were present, 400 additional target reports per second were generated. To accept all of these targets for processing would require a very large computer memory with a capacity of several thousand words, each requiring 50–100 bits, and a very large high speed computer to process and distinguish valid and invalid target reports.

A method used by some systems to inhibit processing of video reports generated by ground clutter is to employ a photographic video mapper. Strong stationary video produces an image on a negative which can be scanned in real time to inhibit video reports. However, photographic video mappers have several deficiencies. They are insensitive to weak or scintillating video returns; they are quite slow in their operation; they are difficult and clumsy to use and maintain; and they are not very reliable. Also, photographic video mappers do not "see" all of the video target returns that the automatic data processor detects. Therefore, a photographic video mapper is not well suited to control the operation of an automatic video processing system.

Other contemporary systems use a different technique to screen the invalid video reports from the valid video reports before they are processed by the computer. A common method used in the past was to count the number of hits in an area and to prohibit automatic entry from any area that contained too many hits. Although fairly effective, this system is complex and expensive to implement and generated approximately 150 invalid target reports per scan when tested in a typical radar environment.

Other techniques, such as the solid area matrix and the statistical sampling device, were devised to reduce the number of invalid reports entering the computer-memory system. The former, described in copending application for patent, entitled Radar Video Processing Apparatus, Richard Dean Wilmot, Inventor, Ser. No. 440,024, filed Mar. 15, 1965, analyzed the hit patterns of video returns, and the latter, described in copending application for patent, entitled, Radar Video Processing Apparatus, Richard Dean Wilmot, inventor, Ser. No. 445,130, filed Apr. 2, 1965, examined the hit densities of video returns. Although quite effective and relatively inexpensive, there was still one type of invalid video return which these devices did not detect. This is the so-called "dark target" which has a video pattern identical to that of a valid target. A dark target is a stationary, video return, such as might be received from the top of a distant mountain. The term "dark target" probably originated from systems which processed these targets with their computers and stored them in their memories but did not display them. Tests revealed that because of scintillation effects returns from these stationary targets actually changed position a slight amount from scan to scan whereby they give appreciable random velocities when automatically tracked. Therefore, merely examining the magnitude of the velocity was found to be an inadequate test for determining the presence of a dark target.

It is, therefore, an object of the present invention to provide an improved video mapping device.

Another object of the present invention is to provide an improved dark target memory.

A further object of the present invention is to provide a manual apparatus to enable an operator to select which areas will have automatic video processing.

Still another object of the present invention is to provide an apparatus to allow automatic blanking of slow moving targets as well as stationary returns by appropriate choice of time sample intervals and quantum area sizes.

In accordance with the present invention, a memory is used which is synchronized with the radar and which maps the entire surveillance area of the radar into small quantum areas which typically are of a size that is only a few square miles in area. The memory described herein contains two code bits corresponding to each quantum area; the code bits can be controlled by either manual or automatic entry devices. The manual controls are for the use of an operator to allow the selection of areas which will have automatic video processing. Automatic entries, on the other hand, are made from a target detector. When a target is reported by the target detector, i.e., the minimum hit criterion is satisfied, the code for that quantum area is changed. After an appropriate time interval, the target detector is sampled again, and if a target is reported, the code is changed. If a target is consistently found in the same quantum area, it is a stationary return and that area is blanked; i.e., no auto-processing is done in that area. Besides inhibiting the target detector for that area, the blank code is displayed on a console to provide a digital video map of the surveillance area.

In particular, a core memory of 1024 words with 12 bits each is employed for a radar surveillance area of 360° in azimuth and 160 miles in range. All 1024 words are addressed every 60°, whereby there are 1024 words of 2 bits each for every 60° segment. The 1024 words are divided into 16 azimuth counts and 64 range counts ($16 \times 64 = 1024$) whereby each sector, or quantum area, is 3.75° by 2.5 miles. A counter keeps track of which 60° segment is being processed so that the correct set of bits is controlled. A typical time interval is 2.5 minutes and the code is counted in a manner to blank a quantum area automatically in response to two successive target reports from the same location, and counts down to zero when no target video is detected.

The above-mentioned and other features and objects of this invention and the manner of obtaining them will become more apparent by reference to the following description taken in conjunction with the accompanying drawings, wherein.

Figure 1:
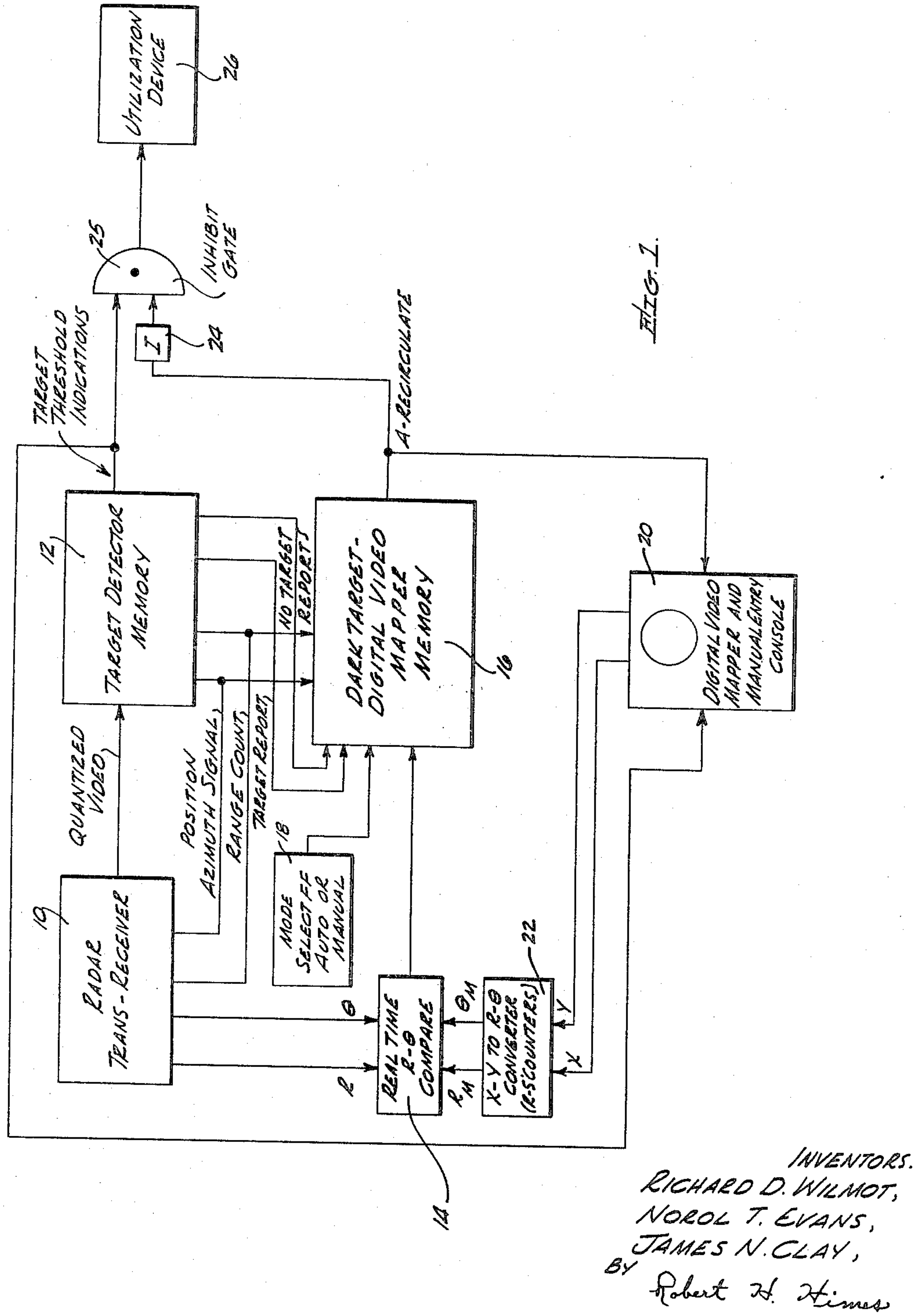
FIG. 1 shows a schematic block diagram of an embodiment of a radar surveillance system incorporating the video mapping apparatus of the present invention.
Figure 2:
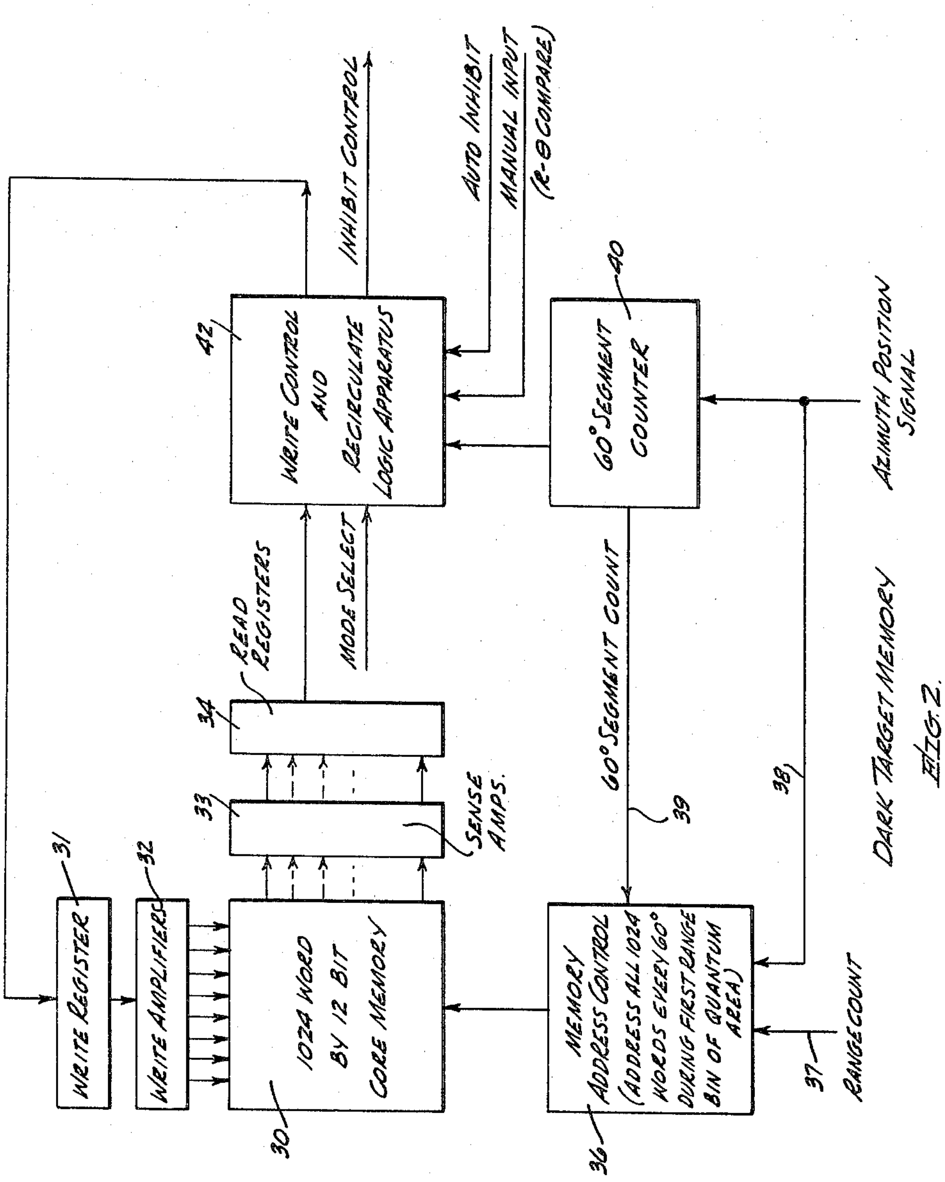
FIG. 2 illustrates a schematic block diagram of the video mapping apparatus of the apparatus of FIG. 1.
Figure 6:
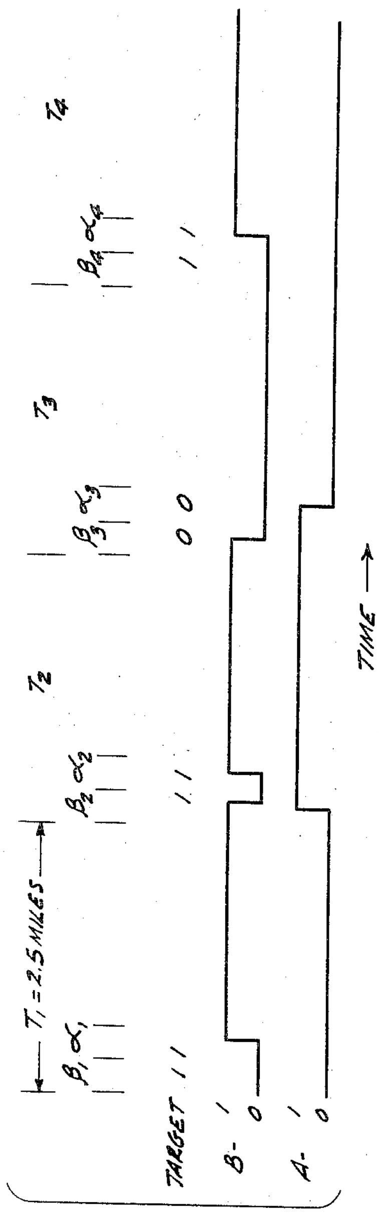
Figure 5:
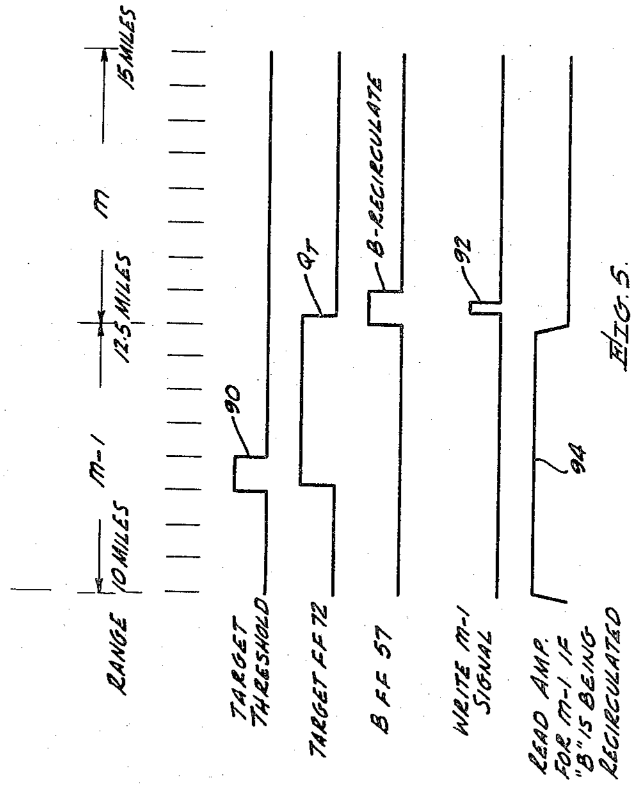
Figure 3:
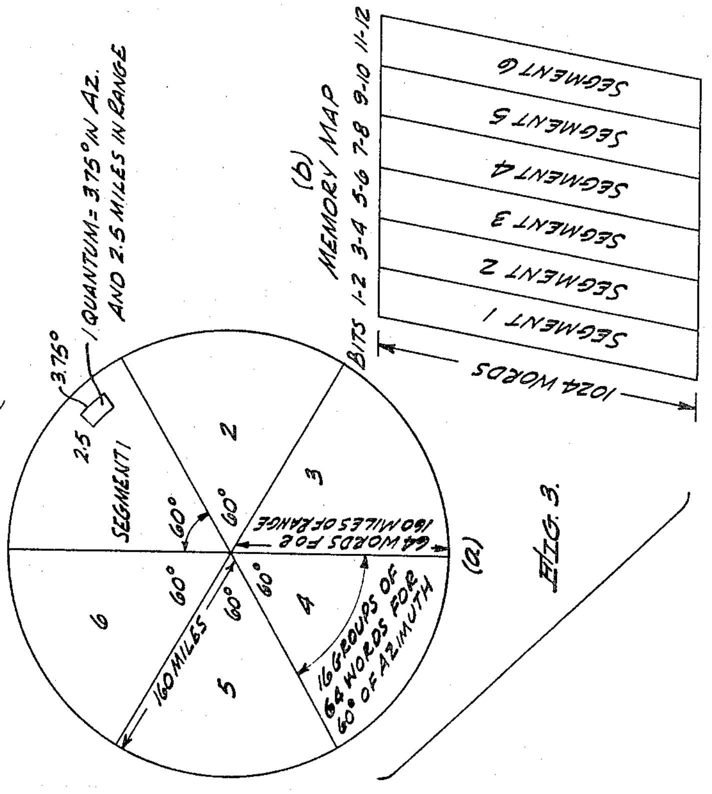
Figure 4A:
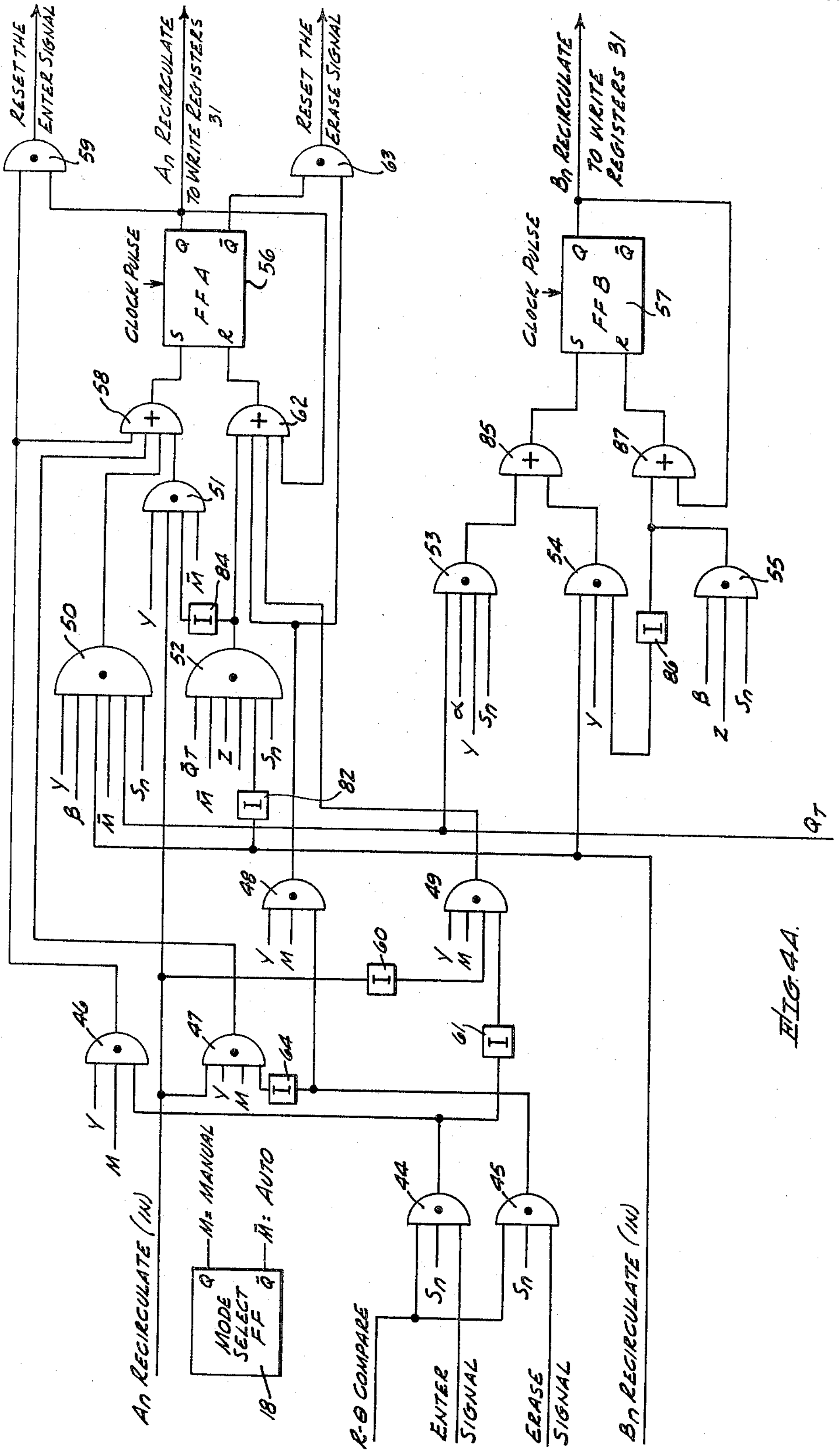
Figure 4B:
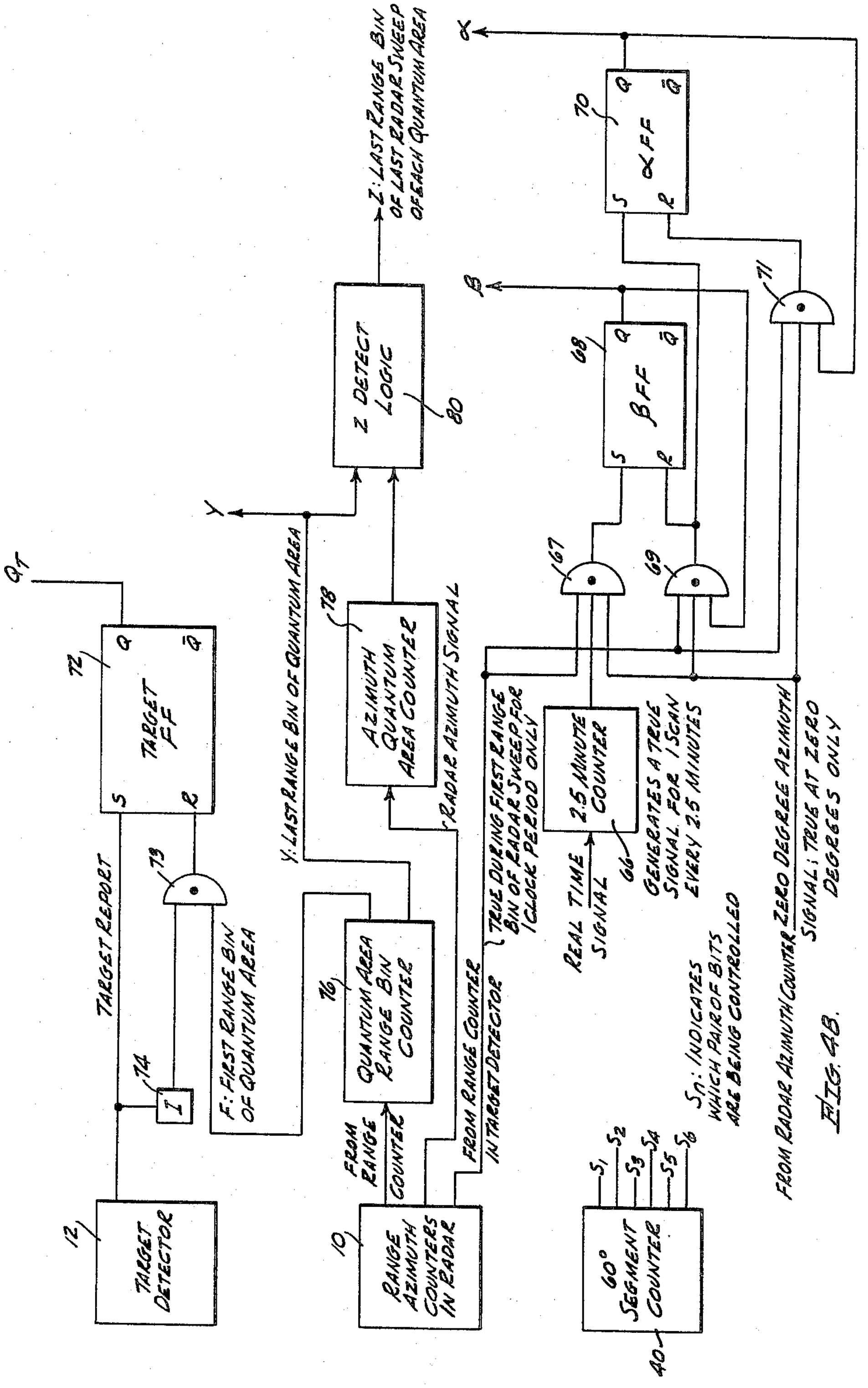

FIGS. 3(*a*) and 3(*b*) illustrate the correlation between azimuth segments of a plan position visual display and a map of the core memory employed in the video mapping apparatus of FIG. 2;

FIG. 4 (divided into FIGS. 4A and 4B due to lack of space) shows an illustrative embodiment of the recirculate logic in the video mapping apparatus of FIG. 2; and FIGS. 5 and 6 illustrate the logic in the video mapping apparatus of FIGS. 1 and 2.

In describing the apparatus of the present invention, a convention is employed wherein individual "and" and "or" gates are shown as semicircular blocks with the inputs applied to the straight side and the output appearing on the semicircular side. An "and" gate is indicated by a dot (·) and an "or" gate by a plus (+) in the semicircular block. As is generally known, an "and" gate produces a "one" or information level output signal only when every input is at the information level; whereas, an "or" gate produces an information level output signal when any one of the input signals applied thereto are at the information level.

Also, in addition to the above, a convention is employed in describing the particular embodiment of the present invention wherein the two inputs of the flip flops are designated as "set" and "reset" inputs. An information level signal applied to either the set or reset inputs of a flip flop will change its state in a manner such that an information level signal appears at the corresponding principal, or Q output, or complementary, or $\overline{Q}$ output, terminal. Further, if information level signals are applied to both the set and reset inputs of a flip flop, the flip flop will revert to the reset state. If no input signals are applied, the flip flop will remain in its previous state. Also, if clock pulses or range bin counts are used to control flip flops, the flip flops will have one period delay (i.e., one range bin) between the logic inputs and the flip flop response.

Referring now to FIG. 1, there is illustrated an embodiment of a radar surveillance system incorporating the video mapping device of the present invention. In particular, the radar surveillance system of FIG. 1 includes a radar transmitter-receiver 10 which generates quantized video together with an azimuth position signal and range count signals which are applied to a target detector memory 12 and, in addition, generates range (R) and zimuth ($\theta$) information which is applied to a real time (R–$\theta$) compare apparatus 14. In addition, the azimuth position signal and range count signals generated by the radar transmitter-receiver apparatus 10 are applied to a dark target memory apparatus 16. The dark target memory apparatus 16 operates in either a manual or an automatic mode as determined by the state of a mode select flip flop 18. When operating in the manual mode, information is received from the real time (R–$\theta$) compare apparatus 14 in accordance with manual entries made by an operator in a digital video mapper and manual entry console 20. Console 20 may include a conventional electro-mechanical switching matrix or, alternatively, a track ball positioning device of a type described in Patent No. 3,013,441, entitled "Tracking Control Apparatus," W. F. Alexander, inventor. The console 20 generates rectangular coordinate outputs X–Y which are converted to range ($R_M$) and azimuth ($\theta_M$) outputs, respectively, by means of an X–Y to R–$\theta$ converter 22 which includes range-sector counters that operate in synchronism with the range-azimuth signals generated by radar transmitter-receiver 10. Thus, in operation, the real time (R–$\theta$) compare apparatus 14 generates an information level signal that is applied to the dark target memory 16 at the commencement of every sector of individual quantum areas whenever the sweep of the radar transmitter-receiver 10 crosses a quantum area that is to be blanked. Quantum areas to be blanked may be selected, for example, by a switching matrix or by the aforementioned tracking control apparatus. Two types of real time cathode ray tube displays are readily available. The outputs of read register 34 which are addressed in real time and in synchronism with the radar display can be used to intensity modulate the cathode ray tube. The blanked areas can be displayed as brighter or dimmer than the normal cathode ray tube intensity. Another type of display will paint only the outlines of blanked areas. The first and the last sweeps of each quantum area that is blanked are painted on the cathode ray tube to outline the sides of the inhibited areas; the ends of the inhibited areas are painted whenever a change from not blank to blank or blank to not blank occurs in real time (in range).

During the automatic mode of operation, as determined by the mode select flip 18, the dark target memory 16 operates in response to target and no-target reports generated by the target detector memory 12. These target reports are generated serially by range for successive sweeps through successive quantum sectors of the display. This sector includes, for example, one azimuth sweep of the radar transmitter-receiver 10 per each 0.1° of the sector or 37 sweeps in the present example. The dark target memory 16 generates an inhibit signal designated as the "A-recirculate" signal which for typical non-reversing operation is repeated for as many times as there are azimuth sweeps in a quantum sector, e.g., thirty-seven azimuth sweeps. The A-recirculate signal is applied to the digital video mapper and manual entry console 20 to provide a map of the blanked areas and, in addition, is applied through an inverter 24 to the input of an inhibit gate 25 which in the disclosed embodiment constitutes an "and" gate. The inhibit gate 25 additionally receives target threshold indications from the target detector memory 12 which may be processed to eliminate invalid targets in accordance with solid area reject, statistical area reject systems or other contemporary systems. The target threshold indications are additionally applied to the digital video mapper console 20 to assist an operator in making manual blanking entries. Lastly, the output of the inhibit gate 25 is applied to a utilization device 26 which may include visual displays or computers for additional data processing.

Referring now to FIG. 2, there is shown an embodiment of the dark target memory 16 of the apparatus of FIG. 1. The dark target memory 16 includes a core memory 30 having associated write register 31, write amplifiers 32 and sense amplifiers 33 together with read registers 34. The core memory 30 has, by way of example, 1024 words by twelve bits. The manner in which the memory is allocated is illustrated in FIGS. 3(*a*) and 3(*b*) of the drawings. Referring to FIG. 3(*b*), two bits of the twelve bits in each of the 1024 words are allocated to a 60° segment of the visual display as illustrated in FIG. 3(*a*) of the drawings. Thus, for example, bits 1, 2; 3, 4; 5, 6; 7, 8; 9, 10; and 11, 12 of each 12-bit word are allocated to the 60° segments 1, 2, 3, 4, 5 and 6, respectively, of the visual display. Further, the 1024 words of the memory 30 are divided into sixteen groups of sixty-four words each. Each of the sixteen groups represents a single quantum sector which is 1/16 of 60° or 3.75° in azimuth. In the surveillance radar of the present invention, the range is 160 miles. Thus, the 64 words in each 3.75° sector correspond to 160 miles, whereby each quantum area is 2.5 miles in range. It is, therefore, evident that the core memory 30 divides up the entire visual display into quantum areas 3.75° in azimuth and 2.5 miles in range with two bits in each word being allocated to each quantum area in the display.

Referring again to FIG. 2, the core memory 30 is programmed by a memory address control 36 which operates in response to a range count input signal and an azimuth position signal available on leads 37, 38, respectively, FIG. 2, from the radar transmitter-receiver 10 and in response to a 60° segment counter 40. The 60° segment counter 40, in turn, operates in response to the azimuth position signal available from the radar transmitter-receiver 10. In general, the memory address control addresses the 1024 words of memory 30 every 60°, with each group of 64 words being addressed by the number of times that there are azimuth sweeps in each quantum area of the visual display before proceeding to the next group of 64 words. By word of example, a typical radar system has one azimuth sweep for each 0.1° through each quantum area of the visual display.

To create the proper timing for the memory recirculation, the memory address control 36 delays the write address by one count from the read address. This means that during the first range bin of a quantum area the data in a word $m$ is transferred from the memory 30 to the read registers 34 (FIG. 2), and during this same clock period, the data in the write register 31 is written into memory 30 at address ($m$–1) because the data contained in write register 31 was sampled in the last range bing of the previous quantum area whose address was ($m$–1).

The write control and recirculate logic apparatus 42 operates in response to a 60° segment count signal from 60° segment counter 40 and from target reports from target detector memory 12 or from a manual input from the R—$\theta$ compare apparatus 14 as determined by the state of mode select flip flop 18. The apparatus 42 recirculates without change each word of the core memory 30 corresponding to the five 60° segments of the visual display not being updated back to the write register 31. During the updating scans, the two bits in each word of the core memory 30 corresponding to the segment under surveilliance are passed through recirculate logic, an example of which is hereinafter described in more detail in connection with FIG. 4, and returned to write register 31 of core memory 30. The two bits corresponding to the segment of the visual display being updated are designated as "$A_n$-recirculate" and "$B_n$-recirculate." The $B_n$-recirculate signal constitutes information concerning the initial appearance of one or more targets in the quantum areas of 3.75° sectors of the 60° segment and is used only in the automatic mode of operation. The $A_n$-recirculate signal, on the other hand, constitutes inhibit information for both the auto and manual modes of operation and is applied through the inverter 24 to the inhibit gate 25 as previously specified and, in addition, is used to generate a vido mapper display on the console 20.

Referring now to FIG. 4 of the drawings, there is shown an embodiment of one set of the recirculate logic of apparatus 42, FIG. 2, for the $A_n$-recirculate and $B_n$-recirculate signals which update the information stored in the two bits of memory 30 corresponding to the 60° segment identified by $S_n$ of the display ever 2.5 minutes. In particular, one set of recirculate logic for each segment of apparatus 42 includes "and" gates 44, 45, 46, 47, 48, 49, 50, 51, 52, 53, 54 and 55, together with A and B flip flops 56 and 57, respectively, the "and" gates 44, 45, 46, 47, 48 and 49 determining the logic for one segment (i.e., segment $n$) in the manual mode of operation, and the "and" gates 50, 51, 52, 53, 54 and 55 determining the logic for the same segment (i.e., segment $n$) in the automatic mode of operation where $n$ has a value for each segment of the display. In describing the inputs to the "and" gates 44–55, the following nomenclature is employed:

M designates manual mode of operation;

$\overline{M}$ designates automatic mode of operation;

$S_n$ designates the 60° segment count containing the quantum area or areas to be addressed where $n$ assumes successive values from 1 to and including 6;

Y designates a signal that is true during the last range bin of any quantum area; and Z designates a signal that is true for the last sweep and last range bin of any quantum area.

In addition, R–$\theta$ compare, enter and erase signals are available from the R–$\theta$ compare apparatus 14 as determined by entries made by an operator into console 20.

Considering the manual mode of operation, the R–$\theta$ compare and $S_n$ signals are applied to inputs on both "and" gates 44, 45. In addition, the enter signal is applied to a third input of "and" gate 44 and an erase signal is applied to a third input of "and" gate 45. The R–$\theta$ compare enter and erase signals are all determined by manual entries in console 20 and are available from the real time R–$\theta$ compare apparatus 14. The output from "and" gate 44 is applied together with signals Y and M to inputs of "and" gate 46, the output of which is connected through an "or" gate 58 to the set input of A-flip flop 56 and, in addition, is connected to an input of an "and" gate 59 together with the Q output of A-flip flop 56. The output of "and" gate 59 is returned to console 20 to reset the enter signal. In addition, the $A_n$-recirculate signal and the output from "and" gate 44 are connected through inverters 60, 61, respectively, and are connected to inputs of "and" gate 49 together with signals Y and M. The output from "and" gate 49 is connected through an "or" gate 62 to the reset input of A-flip-flop 56.

The output from "and" gate 45, on the other hand, is connected to an input of "and" gate 48 together with signals Y and M. An output from "and" gate 48, in turn, is connected through the "or" gate 62 to the reset input of A-flip flop 56 and, in addition, is connected with the $\overline{Q}$ output of A-flip flop 56 to inputs of an "and" gate 63, the output of which is returned to console 20 to reset the erasing signal. Further, the output from "and" gate 45 is connected through an inverter 64 to an input of "and" gate 47 together with the $A_n$-recirculate, Y, and M signals. The output from "and" gate 47 is connected through "or" gate 58 to the set input of A-flip flop 56. The Q output from A-flip flop 56 is connected through the "or" gate 62 to the reset input thereof and, in addition, provides the $A_n$-recirculate signal which is returned to the write register 31.

In order to instrument the automatic mode of operation, it is necessary to generate a target detect signal $Q_T$, a signal Z which is true for the last range bin of the last sweep of any quantum area, and scan signals $\beta$ and $\alpha$, which are true for successive scans once every 2.5 minutes. The signals $\beta$ and $\alpha$ may be generated, for example, by means of a 2.5 minute counter 66 which receives a real time signal and generates a true signal for one scan every 2.5 minutes. The output from the 2.5 minute counter 66, together with a 0° azimuth signal and a first range bin signal are applied to the inputs of an "and" gate 67, the output of which is connected to the set input of $\beta$-flip flop 68. The 0° azimuth signal and the first range bin signal are available from the radar 10 and are true at 0° only and for the first range bin of the radar sweep, respectively. The Q output of $\beta$-flip flop 68 is returned to an "and" gate 69 together with the first range bin and 0° azimuth signals. The output from "and" gate 69 is connected to the reset input of $\beta$-flip flop 68 and, in addition, is connected to the set input of α-flip flop 70. The Q output of the β-flip flop 68 then provides the β signal. To generate the α signal, the first range bin and the 0° azimuth signals together with the Q output of α-flip flop 70 are connected to respective inputs of an "and" gate 71, the output of which is connected to the reset input of α-flip flop 70. The Q outputs of β and α-flip flops 68, 70 provide the β and α signals, respectively, which remain true for successive scans of the radar once every determinable period of time, such as 2.5 minutes.

The target indication signal, $Q_T$, is generated at the Q output of a target flip flop 72, the input of which is set like target reports from target detector 12. Reset signals, on the other hand, are developed at the output of an "and" gate 73, one input of which is connected through an inverter 74 to the target reports received from target detector 12, and the remaining input of which constitutes a signal which is true during the first range bin of each quantum area. This latter signal is provided by a quantum area range bin counter 76 which receives range bin count signals from the radar 10. In addition, the quantum area range bin counter 76 generates the signal Y which is true for the last range bin of each quantum area. The signal Y, together with a signal which is true for the last radar sweep in each quantum area developed by an azimuth quantum area counter 78 in response to radar azimuth signals is applied to Z detect logic apparatus 80 which generates the signal Z. As previously specified, the signal Z is true for the last range bin of the last radar sweep of each quantum area covered by the radar 10.

In the automatic mode of operation, the A-flip flop 56 during the β scan is set by true signals appearing at the output of "and" gate 50 which receives inputs from signals Y, β, $B_n$-recirculate, $\overline{M}$, $Q_T$ and $S_n$. During the α scan, on the other hand, A-flip flop 56 can be reset through "or" gate 62 when the output of "and" gate 52 is true. "And" gate 52 receives signals $\overline{Q_T}$, $\overline{M}$, Z, α and $S_n$, together with $B_n$-recirculate connected to an input thereof through an inverter 82. In addition, the output of "and" gate 52 is connected through an inverter 84, together with signals Y, $A_n$-recirculate and $\overline{M}$. The output of "and" gate 51 is connected through the "or" gate 58 to the set input of A-flip flop 56.

The B-flip flop 57 which writes the temporary bit B is set by true signals appearing at the output of "and" gates 53 and 54 connected through an "or" gate 85 to the set input thereof. The "and" gate 53 receives the signals $Q_T$, α, Y, and $S_n$, while the "and" gate 54 receives the signals $B_n$-recirculate and together with the output of "and" gate 53 or 54 connected through an "or" gate 85 to the set 55 is connected through an inverter 86. The "and" gate 55, in turn, receives the signals β, Z and $S_n$. In addition to being connected through the inverter 86 to the input of the "and" gate 54, the output of "and" gate 55 is connected through an "or" gate 87 to the reset input of B-flip flop 57. Both the A and B anti-race flip flops 56, 57 are automatically reset at the termination of every quantum area by means of connections from the Q outputs thereof through "or" gates 62, 87, respectively, to the respective reset inputs thereof. The operation of the above logic may best be described by the following logical equations:

$$S_{AB}=(A)\cdot(S_n)\cdot(Y)\cdot(\text{Scan }\beta)\cdot(R.A._{BT})\cdot(Q_T)$$
$$+(A)\cdot(Y)\cdot(R.A._{AB})\cdot[\overline{S_n}+\overline{Z}+\overline{\text{Scan}}\ \alpha+R.A._{BT}+Q_T]$$
$$+(M)\cdot(S_n)\cdot(Y)\cdot(\text{Compare})\cdot(\text{Enter})$$
$$+(M)\cdot(Y)\cdot(R.A._{AB})\cdot[\overline{S}_n+\overline{\text{Compare}}+\overline{\text{Erase}}]$$
$$R_{AB}=(A)\cdot(S_n)\cdot(Z)\cdot(\text{Scan }\alpha)\cdot\overline{(R.A._{BT})}\cdot\overline{(Q_T)}+Q_{AB}$$
$$+(M)\cdot(S_n)\cdot(Y)\cdot(\text{Compare})\cdot(\text{Erase})$$
$$+(M)\cdot(Y)\cdot(\overline{R.A._{AB}})\cdot[\overline{S_n}+\overline{\text{Compare}}+\overline{\text{Enter}}]$$
$$S_{BT}=(S_n)\cdot(Y)\cdot(\text{Scan }\alpha)\cdot(Q_T)$$
$$+(Y)\cdot(R.A._{BT})(\overline{S_n}+\overline{\text{Scan}}\ \beta+\overline{Z})$$
$$R_{BT}=(S_n)\cdot(\text{Scan }\beta)\cdot(Z)+Q_{BT}$$

wherein:

$S_{AB}$ designates the set term for the A-flip flop 56
$S_{BT}$ designates the set term for the B-flip flop 57
$R_{AB}$ designates the reset term for the A-flip flop 56
$R_{BT}$ designates the reset term for the B-flip flop 57
A designates automatic mode of operation
$S_n$ designates proper 60° segment count for the write control flip flops 56, 57
Y designates the last range bin of any quantum area
$RA_{BT}$ designates read register 34 output for the $B_n$-recirculate signal
$RA_{AB}$ designates read register 34 output for the $A_n$-recirculate signal
$Q_T$ designates target detect flip flop 72 which is set by target reports from the target detector 12
M designates manual mode of operation
Z designates the last range bin of the last sweep of any quantum area.

In the operation of the video mapping device of the present invention, the core memory 30 is operated in synchronism with the radar transmitter-receiver 10 by the memory address control 36. The memory 30 is addressed for one clock period (1 clock period=1 range bin) during each radar sweep through a quantum area. This clock period is at the first range bin of each quantum area. The A and B flip flops 56, 57 have logic inputs which are true at the last range bin of the quantum area and include anti-race circuits which effect a response to the input logic one clock period later which is the first range bin of the next quantum area in range. In addition, because A and B flip flops 56, 57 which provide the write control are true for only the first clock period in each quantum area, it is necessary for the outputs from read registers 34 to generate the memory information from the first range bin of a quantum area to the beginning of the next quantum area in range. These outputs of the read registers 34 are used to inhibit target reports and to generate a real time display of inhibited areas on the cathode ray tube of the display console 20.

In particular, the memory address control 36 addresses successive words in each 64 word group for the number of times that there are azimuth sweeps in each quantum sector. It has been assumed by way of example that there are thirty-seven azimuth sweeps within each quantum sector. Thus, after addressing each word in a 64 word group thirty-seven times in rotation, the words in the next group of 64 words corresponding to the next successive azimuth quantum sector are addressed in a similar manner. The write control logic apparatus 42, on the other hand, updates the two bits corresponding to the 60° segment being counted, as determined by the 60° segment counter 40 during the α and β scans as hereinafter described. The remaining bits of each 12 bit word are returned without change to core memory 30.

Manual entries are entered into the digital video mapper and manual entry console 20 by an operator where they are synchronized with the core memory 30 by, for example, appropriate range and azimuth counters in a manner such that the R–θ compare apparatus 14 generates an information level signal during periods when the radar sweep traverses a quantum area to be blanked. Various switching matrices can be readily adapted to accomplish this function.

Referring to FIG. 4, manual operation is initiated by setting the mode select flip flop 18 to provide an information level signal on the principal output thereof which activates the "and" gates 46, 47, 48, 49. The zero level signal, $\overline{M}$, necessarily on the complementary output of mode select flip flop 18 prevents any information level signal from appearing at the outputs of "and" gates associated with A-flip flop 56 in connection with the automatic mode of operation. The output signal from the R–θ compare apparatus 14 sets the A-flip flop 56 during the periods that it is at information level and resets it (if the correct quantum area is being addressed) during the periods that it is at zero level. In addition to being used to control the inhibit gate 25, the A-recirculate signal is returned to the core memory 30 to provide blanking information until erased.

Referring now to FIG. 5 of the drawings, there is shown waveforms illustrating the general operation of the apparatus of FIG. 4 during a single sweep across two quantum areas. Quantum area $m-1$ is taken from 10.0 miles to 12.5 miles, and the next successive quantum area $m$ extends from 12.5 miles to 15 miles. Waveform 90 indicates that a target report occurs during the mid-portion of the $(m-1)$ quantum area. Upon receipt of the target report 90, the target flip flop 72 is set whereby the $Q_T$ output thereof reverts to the true state for the remainder of the $(m-1)$ quantum area. The signal $O_T$ sets the B-flip flop 57 causing the Q output thereof, which writes the B-recirculate signal, to be true during the first range bin of the quantum area $m$. This signal is automatically reset false after this range bin. As previously specified, however, because the write address is delayed by one count from the read address, the $(m-1)$ write signal occurs during the first range bin of $m$ as illustrated by waveform 92 thereby writing the temporary bit B true for the $(m-1)$' quantum area. Subsequently, if the target report remains, the B-recirculate signal for quantum area $(m-1)$ will be true for the entire area as illustrated by waveform 94. In the event that the logic is satisfied for the A-recirculate signal, the timing will be the same as that described above for the B-recirculate signal.

Referring now to FIG. 6, there is illustrated the state (i.e., true or false) of the A bit and the B (temporary) bit for a specific quantum area of the display for several time intervals, T, the duration of which is determined by the 2.5 minute counter 66, FIG. 4, during automatic operation of the apparatus of the present invention. Two sample scans, designated $\beta$ and $\alpha$, are used during each timing interval, T, $\beta$ being the first scan after a new interval T commences and the $\alpha$ scan following immediately thereafter. A new update cycle begins, however, with scan $\alpha$. During automatic operation, the B-flip flop 57 is set during scan $\alpha$ if a target report occurs. If the A bit is true, making the A-recirculate signal true, during this same scan $\alpha$, it will remain true whereby the A-recirculate signal will continue to constitute an inhibit signal. Alternatively, if no target reports occur during scan $\alpha$, the B-flip flop 57 will not be set true thereby causing the A-flip flop 56 to be reset which prevents continued recirculation of a true state on the A-recirculate signal. During the $\beta$ scan of the next timing interval, T, the A-flip flop 56 will be set if the B-recirculate signal is true and a target report occurs. The setting of the A-flip flop 56 causes the A-recirculate signal to be true thereby constituting an inhibit signal. Thus, two target reports within the same quantum area which occur in successive time intervals result in the inhibit signal being written. This inhibit signal is erased during the following $\alpha$ scan if no target reports occur in the quantum area being controlled during this scan.

FIG. 6 illustrates the true or false state of the A and B bits for a specific quantum area for the above-described automatic mode of operation. In FIG. 6, zero level is defined as false and unit level is defined as true. Also, it is assumed that a target does not move out of the quantum area under consideration between the $\alpha$ and $\beta$ scans. Beginning from left to right as viewed in the drawing, both A and B bits are initially false. A target report occurs during scans $\beta_1$ and $\alpha_1$. During scan $\beta_1$, the temporary bit B is false whereby nothing is written in bit A; i.e., the A-recirculate signal remains false whereby no inhibit signal is generated. Subsequently, during scan $\alpha_1$, the target report occurs part way through the scan whereby the B bit is written true for the quantum area. The A bit remains false and the B bit remains true for the remainder of the interval, $T_1$.

A target report is assumed to occur during scans $\beta_2$ and $\alpha_2$ of interval, $T_2$. Thus, the A bit is written true upon arrival of the quantum area under consideration and the detection of a target report during the scan $\beta_2$. The B bit is erased during scan $\beta$ at the last range bin of the specified quantum area. The temporary bit B remains in the false state until the quantum area under consideration is crossed during the scan $\alpha_2$. The existence of the target report causes the temporary bit to be written true at this time. Both the A and B bits remain true for the remainder of the interval, $T_2$.

During $\beta_3$ and $\alpha_3$ scans of the interval $T_3$, it is assumed that the stationary target is no longer detected in the quantum area under consideration whereby there are now no target reports. During scan $\beta_3$, bit B reverts to the false state as the scan crosses over the quantum area under consideration. There is no change in the state of bit A during scan $\beta_3$. At the end of the quantum area during scan $\alpha$, bit A is reset to the zero state. In that there are no target reports, both bit A and the temporary bit B remain false for the remainder of the interval, $T_3$.

During scans $\beta_4$ and $\alpha_4$ of the interval, $T_4$, it is again assumed that a target report is received from the quantum area under consideration. In that the temporary bit B is false, there is no change in the state of bit A during the $\beta_4$ scan; i.e., bit A remains false during this scan. Subsequently, during the $\alpha_4$ scan, the temporary bit B is written true when the scan crosses over the quantum area under consideration. The bit A remains false during the entire $\alpha_4$ scan. There are no changes in the state of the A and B bits during the remainder of the interval, $T_4$, after the $\beta_4$ and $\alpha_4$ scans. The manner in which this operation is achieved is defined by the aforementioned logical equations.

Although the invention has been shown in connection with a certain specific embodiment, it will be readily apparent to those skilled in the art that various changes in form and arrangement of parts may be made to suit requirements without departing from the spirit and scope of the invention. For example, even though the present invention was described in connection with range and azimuth of a two-dimensional surveillance radar, it will be apparent to those skilled in the art that the same techniques also apply for range and azimuth and for range and height of a three-dimensional radar. Also, additional bits per quantum area can be employed to allow simultaneous manual control and automatic operation. Another improvement apparent to those skilled in the art is to decrease the sampling rate as the range and quantum size increase thereby to achieve a more accurate indication of the highest target speed which will cause blanking in the automatic mode.

What is claimed is:

1. A video mapping device for operation in conjunction with a surveillance radar transmitter-receiver apparatus adapted to cover a surveillance area composed of a plurality of equiangular radial segments, each of said equiangular radial segments being divided radially into an equal number of quantum sectors which are each, in turn, divided into quantum areas representative of equal increments of range, said radiar transmitter-receiver apparatus having range count and azimuth position signals and capable of generating a quantized video signal, said video mapping device comprising a memory having a predetermined number of words, each word having first and second bits for each of said plurality of equiangular radial segments constituting the surveillance area of said radar apparatus; means responsive to said range count and azimuth position signals for repeatedly reading out the words of successive groups thereof for a number of times equal to the number of azimuth sweeps in one of said quantum sectors, the number of said successive groups of words being equal to said number of quantum sectors in one of said equiangular radial segments and the number of words in each successive group thereof being equal to the number of said quantum areas in one of said quantum sectors; means including a segment counter for rewriting all of the bits of each word back into said memory without change except said first and second bits corresponding to the equiangular radial segments of said surveillance area being covered by said radar apparatus; means for generating inhibit signals corresponding to quantum areas of said surveillance area selected to be blanked; and means responsive to said inhibit signals for writing successive first bits at information level and for inhibiting corresponding portions of said quantized video signal therewith.

2. The video mapping device for operation in conjunction with a radar transmitter-receiver apparatus as defined in claim 1, wherein said means for generating inhibit signals corresponding to quantum areas of said surveillance area selected to be blanked includes means for manually selected quantum areas to be blanked, and means for comparing the range count and azimuth of said quantum areas with said range count and azimuth position signals thereby to generate said inhibit signals in response to a coincidence therewith.

3. The video mapping device for operation in conjunction with a surveillance radar transmitter-receiver apparatus as defined in claim 1, wherein said means for generating inhibit signals corresponding to quantum areas of said surveillance area selected to be blanked includes means including a target detector memory for providing target threshold indications serially by range; means responsive to said target threshold indications serially by range and to said azimuth position signal for writing successive second bits of said memory at information level during at least one sweep through the quantum areas of each quantum sector; and means responsive to a concurrence at a predetermined interval of time later between said information level indications in said successive second bits and said target threshold indications for generating said inhibit signals.

4. A video mapping device for operation in conjunction with a surveillance radar transmitter-receiver apparatus having range count and azimuth position signals and capable of generating a quantitzed video signal, said video mapping device comprising a memory having a predetermined number of groups of words, each word having first and second bits for each of a plurality of equiangular radial segments constituting the surveillance area of said radar apparatus, the number of said groups of words being equal to the number of quantum sectors in one of said equiangular radial segments and the number of words in each group being equal to the number of quantum areas in one quantum sector; means including a target detector memory for providing target threshold indications serially by range; means responsive to said range count and azimuth position signals for repeatedly reading out the words of successive groups thereof for a number of times equal to the number of azimuth sweeps in one quantum sector; means including a segment counter for writing second bits of said memory at information level in response to the occurrence of a target threshold indication in the quantum area corresponding thereto during a first periodic scan of said radar; means during a second periodic scan of said radar a predetermined period of time later and preceding the next successive first scan for writing said first bits at information level in response to a concurrence of information level signals in said second bits and a target threshold indication; means including a segment counter for continually recirculating all of the bits of each work back to said memory; and means responsive to the state of successive first bits for generating a visual display of the quantum areas having corresponding bits written at information level.

References Cited

UNITED STATES PATENTS

| | | | |
|---|---|---|---|
| 2,668,286 | 2/1954 | White | 343—7.7 |
| 3,129,426 | 4/1964 | Altovsky | 343—17.1 |

RODNEY D. BENNETT, *Primary Examiner.*